Oct. 28, 1930.  C. S. COX  1,780,067
PRESSURE FRUIT GRINDER
Filed Aug. 4, 1928   2 Sheets-Sheet 2
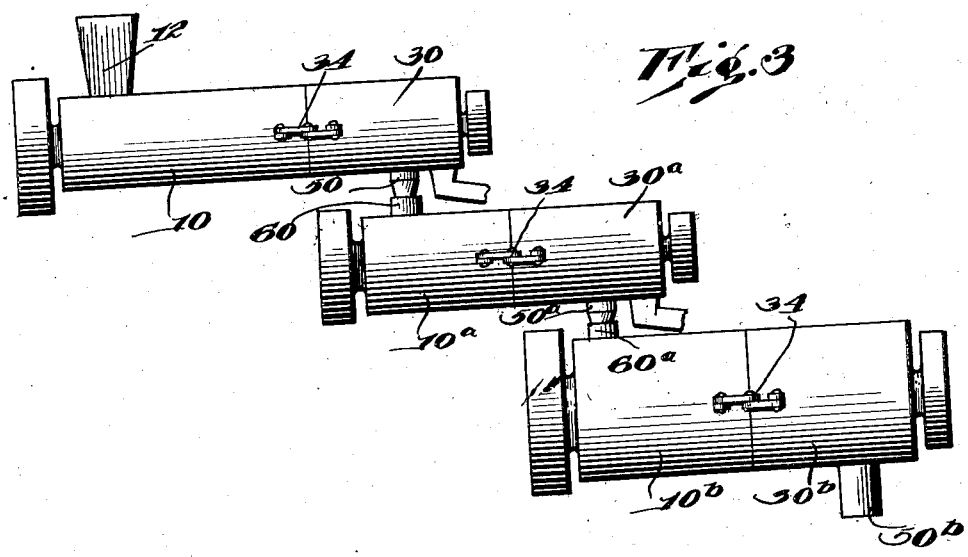
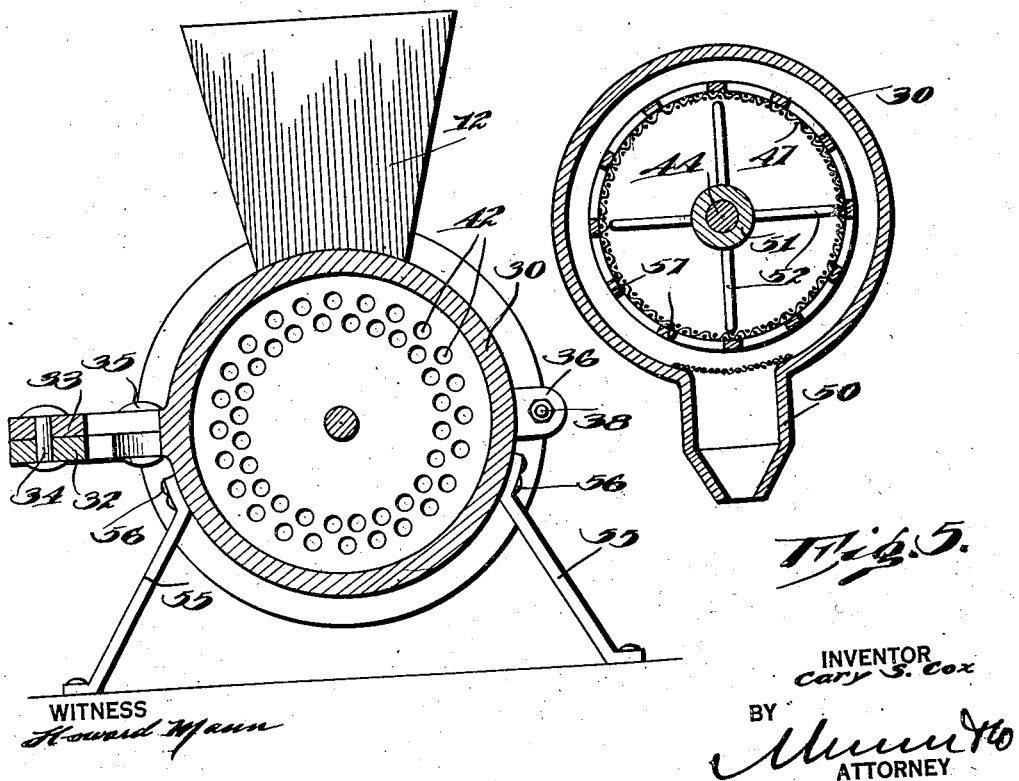
INVENTOR
Cary S. Cox
BY
ATTORNEY
WITNESS
Howard Mann Patented Oct. 28, 1930

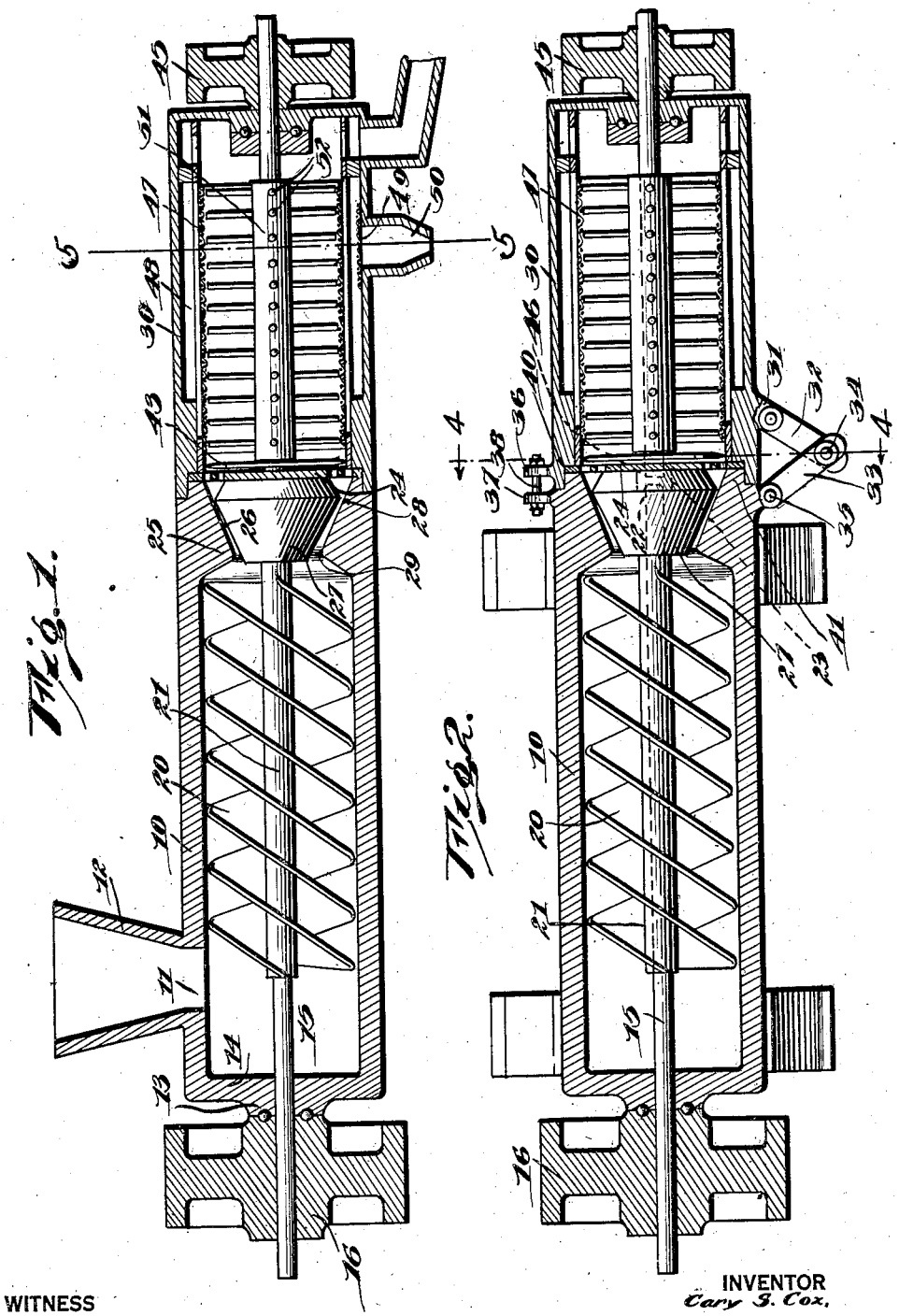

1,780,067

UNITED STATES PATENT OFFICE

CARY S. COX, OF FRESNO, CALIFORNIA

PRESSURE FRUIT GRINDER

Application filed August 4, 1928. Serial No. 297,485.

This invention relates to a device for grinding, and crushing fruits, and for filtering the product.

An object of the invention is the provision of a neat, compact, and unitary structure for carrying out a plurality of associated operations for grinding, and crushing fresh or dried fruits or vegetables and for straining and filtering the product, the grinding and straining devices being located in longitudinal alinement with the ends abutting, and with hinged connections between the members for moving the strainer out of operative relation with the grinder and crusher.

A further object of the invention is the provision of a device for obtaining fluids contained in fruits or vegetables in which a drum has a longitudinally disposed spirally arranged grinding device in axial alinement with a housing provided with a strainer, the adjacent or abutting ends of the drum and housing being hingedly connected together, whereby the housing carrying a strainer may be moved outwardly and away from an end of the drum so that the pulp container within the housing or drum may readily be removed.

This invention will be best understood from a consideration of the following detailed description in connection with the accompanying drawings; nevertheless it is to be understood that the invention is not confined to the disclosure being susceptible of such changes as shall define no material departure from the salient features of the invention as expressed in the appended claims.

In the drawings:—

Figure 1 is a vertical section of the device constructed according to the principles of our invention.

Figure 2 is a longitudinal horizontal section of the device,

Figure 3 is a view in elevation of the units connected in gang,

Figure 4 is a vertical transverse section taken along the line 4—4 of Fig. 2,

Figure 5 is a transverse vertical section taken along the line 5—5 of Fig. 1.

Referring more particularly to the drawings, 10 designates a drum having its axis disposed in a horizontal plane and provided with an opening 11 which is in line with a hopper 12 for feeding fruits or vegetables to the drum. The drum has a bearing 13 formed integrally with a closed end 14, and which receives one end of a shaft 15 secured to the pulley 16.

A spirally arranged grinding device 20 located longitudinally of the drum 10 is mounted on a sleeve 21 secured to the shaft 15. The shaft extends through the drum 10 and terminates at 22 in a bearing 23 formed integrally with a perforated disc 24.

The end of the drum adjacent the disc 24 is cast integrally with an internal enlargement 25 providing a conically shaped passage 26 at the inner end of the drum. In this passage is mounted a cone-shaped member 27 forming a fruit crusher. Crushing effect is provided by the restricted space 28 located adjacent the outer end of the member 27, and the outer end of the passage 26. It will be noted that the side walls of the member 27 are inclined at a greater angle than the passage 26 to provide a flared opening 29 through which the ground food and juices are adapted to be passed before they enter the restricted passage 26. The conically shaped member 27 is secured to the shaft 15 and is revolved thereby.

A housing 30 is provided with ears 31 to which is pivotally connected an arm 32. Arms 33 are pivotally connected at 34 to the arm 32, while the arms 33 are pivotally connected at 35 to the inner end of the drum 10. The end of the housing 30 is provided with an ear 36 adapted to aline with an ear 37 on the drum 10, and a bolt 38 is adapted to maintain the ears 36 and 37 in spaced relation and for securing the drum to the housing 30 in axial alinement with the drum 10.

The inner end of the housing 30 is provided with a shoulder forming a pocket 40 to receive the reduced end 41 of the drum 10, when the drum and housing are in axial alinement. The pocket 30 also receives the disc 24 and when the housing 30 is secured in place, the bottom of said pocket will maintain the disc in position. This disc is provided with a plurality of perforations 42 adjacent the periphery through which the finely ground and crushed pulp is forced in close contact with a revolving blade 43, said blade being secured to a shaft 44 driven by a pulley 45 exteriorly of the housing 30 and having an end, as shown at 46, mounted in the hub or bearing 23 of the disc 24.

A screen or strainer 47 is mounted in the housing 30 and spaced from the housing to provide an annular chamber 48 into which the juices fall and is discharged through a screen 49 and a discharge spout 50.

The sleeve 51 is secured to the shaft 44 and from which projects radially a plurality of beater arms 52 which are revolved in the strainer 47 for thoroughly beating up and agitating the pulp. The outer ends of these beaters, as will be noted, are in close association with the strainer 47. The drum 10 is supported by legs 55 secured at 56 to the side walls of the drum. Cleats 57 aid in maintaining the screen 47 in spaced relation with the inner wall of the housing 30.

Referring more particularly to Fig. 3, it will be noted that a gang of the fruit grinding, crushing and straining devices are combined and in which the discharge spout 50 discharges into a hopper 60 of a drum 10$^a$. The housing 30$^a$ has a discharge spout 50$^a$ and has its lower end in substantially the same horizontal plane as the upper end of a hopper 60$^a$. This hopper is in communication with the drum 10$^b$ while the housing 30$^b$ discharges its liquid contents through the discharge spout 50$^b$. In each of these cases the housings 30, 30$^a$, or 30$^b$, are respectively swingable on the hinged mounting 34 between said housing and the respective drums 10, 10$^a$, and 10$^b$.

The operation of my device is as follows: The fruit or vegetables are placed in the hopper 12 and are passed through the opening 11 into the drum 10 where the spiral member 20 grinds the fruit and moves it with sufficient pressure towards the inner end of the drum to force it through the slanted space 29 into the cone crusher 27, and the conically shaped passage 26. As the ground materials pass the restricted space 28 they are thoroughly crushed before they are forced through the perforations 42 in the disc 24.

When the ground and crushed materials pass through perforations in the disc 24, the knife 43 moves rapidly across the perforations further cutting the materials before they are beaten by the arms 52. It will be noted by this construction that there are quite a number of these arms arranged radially which have their ends moving in close association with the screen 47 so that the juices and the fine pulp are moved in the screen thereby straining the juices which are discharged through the conduit 50.

I claim:

1. A device of the character described comprising a drum, a spiral fruit grinding means arranged longitudinally of the drum, a strainer disposed in alinement with the drum, a housing embracing the strainer and hingedly connected with the drum, a fruit pressing and cutting chamber connecting the drum and strainer, a beater in the strainer mounted for revolution, a shaft for rotating the beater, a shaft in the drum extending longitudinally of the drum and causing rotation of the grinder, a perforated disc having a bearing, the adjacent ends of the shafts being mounted in the bearing, the first mentioned shaft, beater and strainer being movable away from the drum as a unit.

2. A device of the character described comprising a drum, a spiral fruit grinding means arranged longitudinally of the drum, a strainer disposed in alinement with the drum, a housing embracing the strainer and hingedly connected with the drum, a fruit pressing and cutting chamber connecting the drum and strainer, a beater in the strainer mounted for revolution, a shaft for rotating the beater, a shaft in the drum extending longitudinally of the drum and causing rotation of the grinder, a perforated disc having a bearing, the adjacent ends of the shafts being mounted in the bearing, the strainer being hinged to the drum, the second mentioned shaft being supported by the strainer and swingable from an end of the drum with the strainer.

3. A device of the character described comprising a drum, a spirally arranged grinding member located axially of the drum, a housing pivotally connected at one end to an end of the drum and located in axial alinement with the said drum, a cylindrically shaped screen located in the housing and spaced from the same to provide an annular passage, a perforated disc separating the drum from the housing, a cutter revolubly mounted on one side of the disc and a conically shaped fruit crushing member located at the opposite side of the disc, and means for revolving the grinding member, the crushing means and the beater located within the cylindrically shaped screen.

4. A device of the character described comprising a drum, a spirally arranged grinding member located axially of the drum, a housing pivotally connected at one end to an end of the drum and located in axial alinement with the said drum, a cylindrically shaped screen located in the housing and spaced from the same to provide an annular passage, a perforated disc separating the drum from the housing, a cutter revolubly mounted on one side of the disc and a fruit crushing member located at the opposite side of the disc, means for revolving the grinding member, the crushing means and the beater located within the cylindrically shaped screen, said revolving means including a pair of shafts having their ends alined and located adjacent each other, said disc provided with a hub to receive the alined ends and forming a bearing for the adjacent ends of the shafts.

5. A device of the character described comprising a drum, a spirally arranged grinding member located axially of the drum, a housing pivotally connected at one end to an end of the drum and located in axial alinement with the said drum, a cylindrically shaped screen located in the housing and spaced from the same to provide an annular passage, a perforated disc separating the drum from the housing, a cutter revolubly mounted on one side of the disc and a fruit crushing member located at the opposite side of the disc, means for revolving the grinding member, the crushing means and the beater located within the cylindrically shaped screen, said housing being movable outwardly and out of alinement with the drum and carrying the screen and beaters therewith.

CARY S. COX.